United States Patent

[11] 3,527,218

| [72] | Inventor | John R. Westine |
| | | 600 N.W. 9th St., Delray Beach, Florida 33444 |
| [21] | Appl. No. | 647,731 |
| [22] | Filed | June 21, 1967 |
| [45] | Patented | Sept. 8, 1970 |

[54] MEANS FOR CLEANSING TEETH AND GINGIVAL CREVICES
3 Claims, 16 Drawing Figs.

[52] U.S. Cl. .................................................. 128/229, 128/62, 128/66
[51] Int. Cl. ................................................. A61m 3/00
[50] Field of Search .................................... 128/66, 24.1, 224, 229, 76, 24, 24.2, 62

[56] References Cited
UNITED STATES PATENTS

| 803,475 | 10/1905 | Dennis | 128/224 |
| 3,211,149 | 10/1965 | Fono | 128/232 |
| 3,379,192 | 4/1968 | Warren | 128/66 |

Primary Examiner—L.W. Trapp
Attorney—Howard A. Flammer

ABSTRACT: A device for cleaning teeth and their gingival crevices wherein a structure is provided which comprises a semi-flexible cuff like body member which embraces the teeth and gums.

The body member is provided with an inner chamber having perforations therein which are in communication with the teeth and their supporting structure and serve to introduce liquid under pressure to the subject area when said body member is connected to a suitable source of supply.

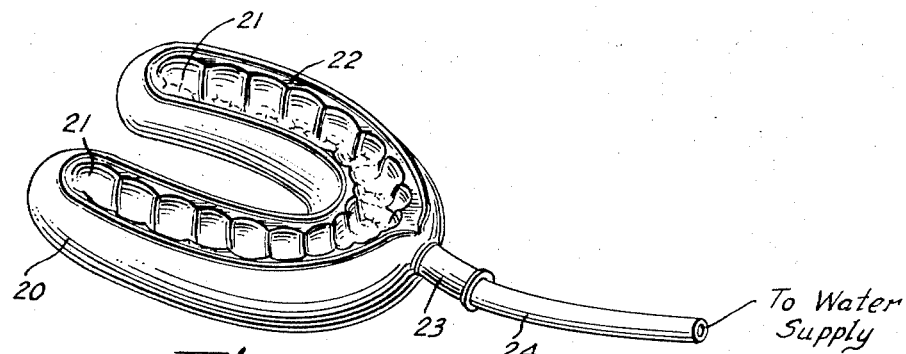
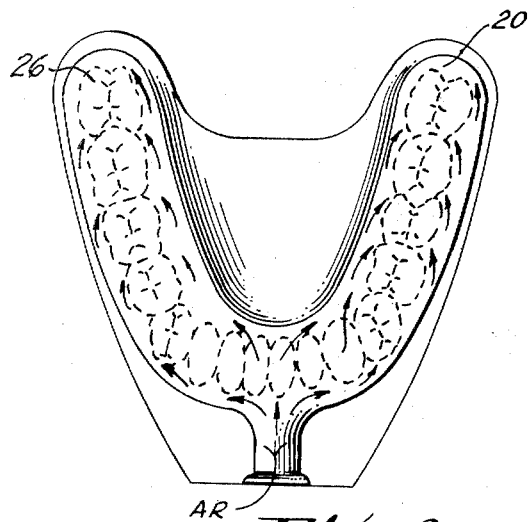
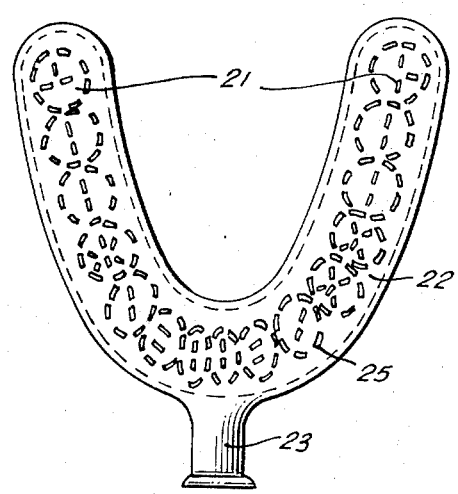
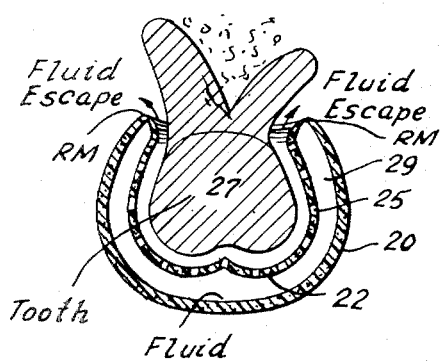
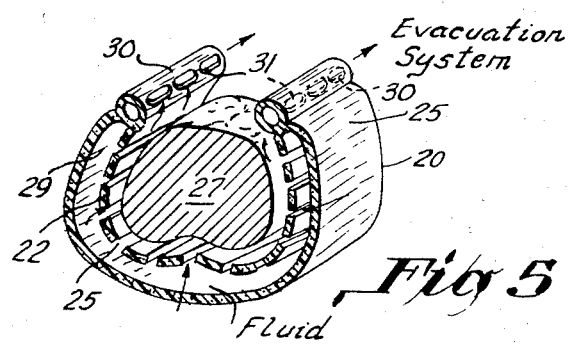
INVENTOR.
John R. Westine

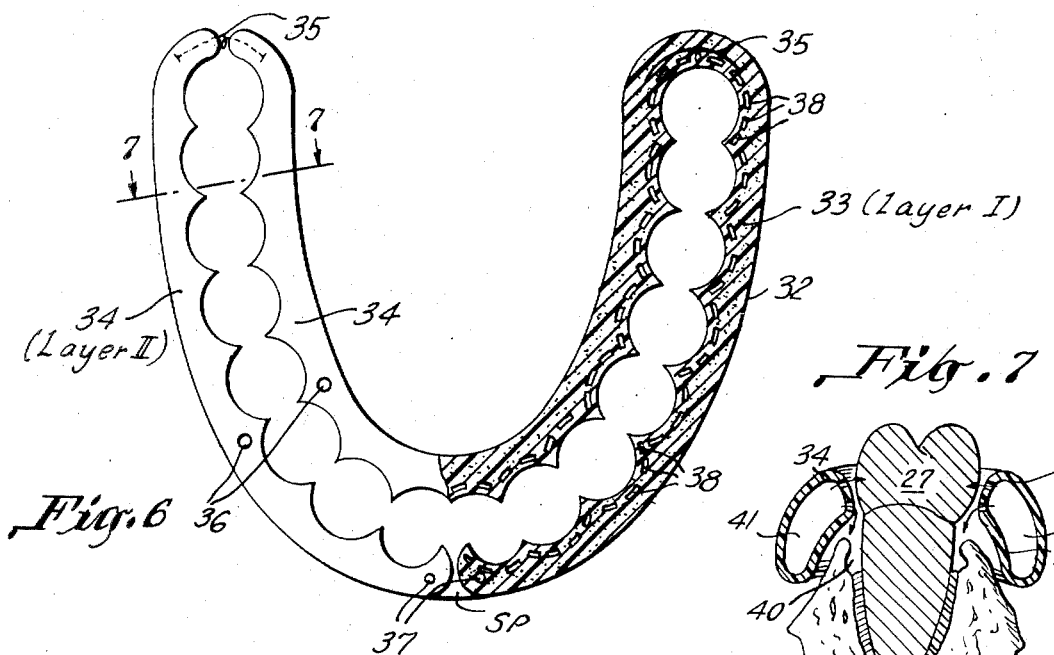
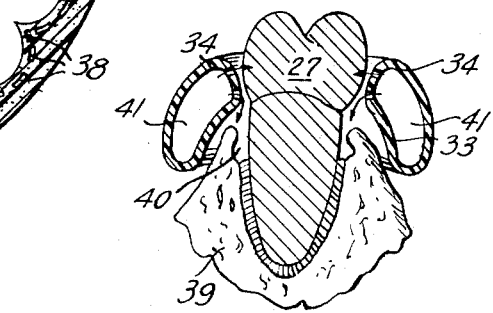
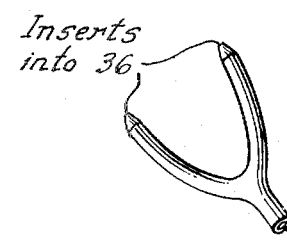
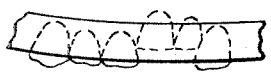
INVENTOR.
John R. Westine

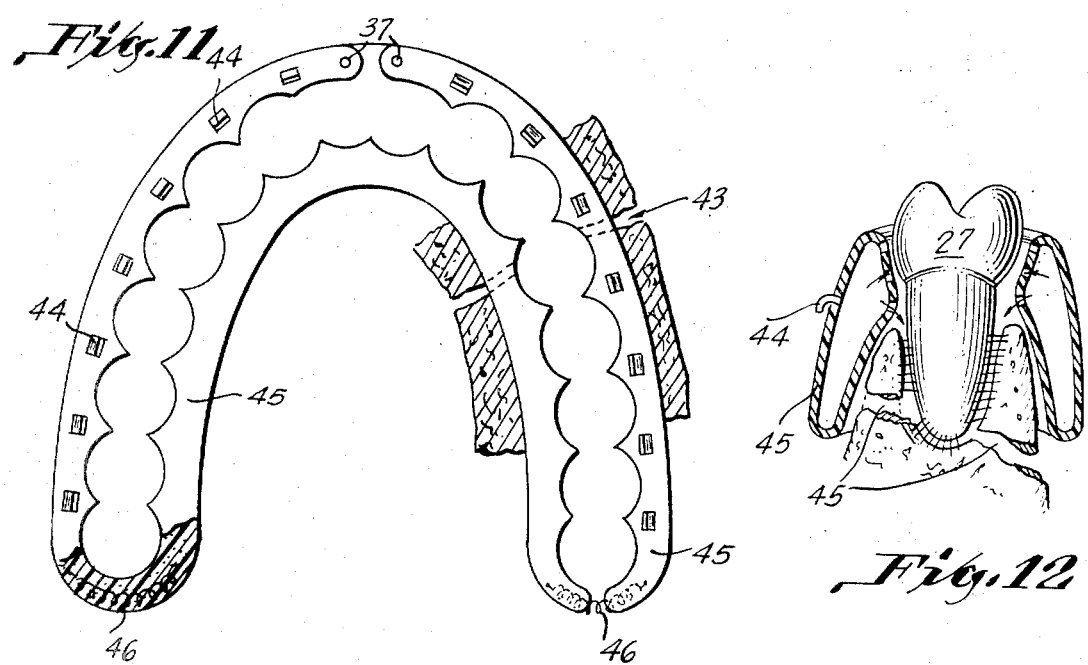
Fig. 11
Fig. 12
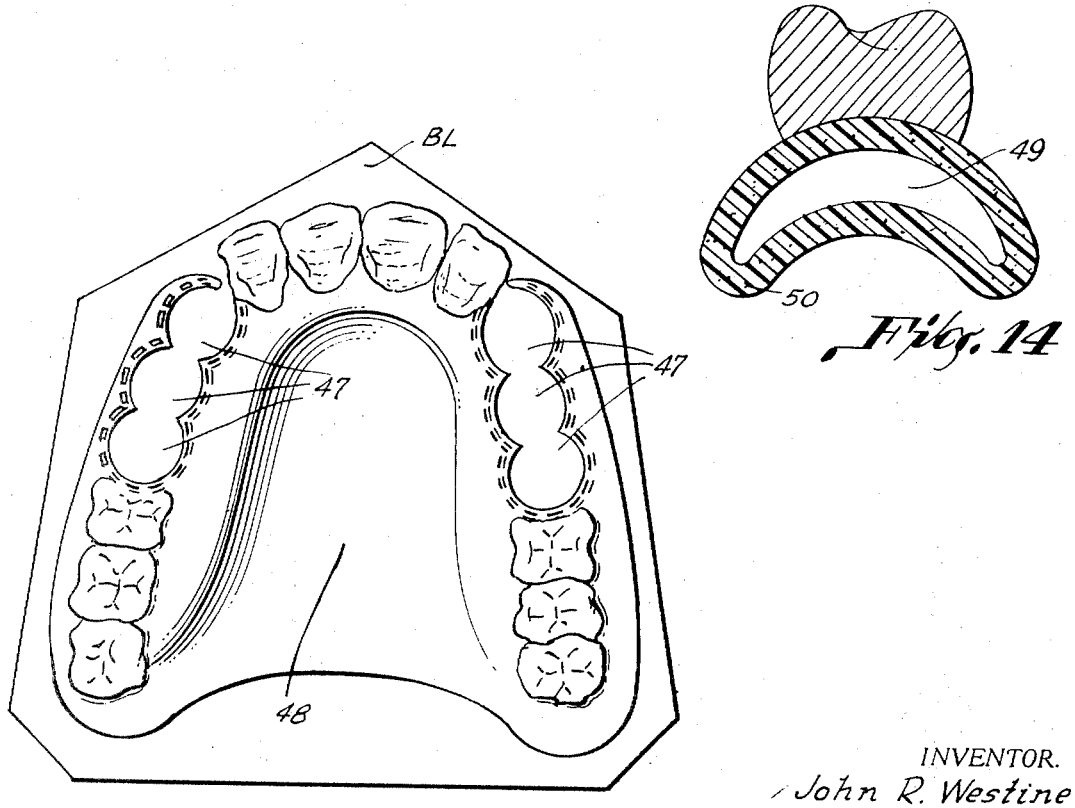
Fig. 13
Fig. 14
INVENTOR.
John R. Westine

MEANS FOR CLEANSING TEETH AND GINGIVAL CREVICES

THE ORAL HYDROMAT AND ITS MODIFICATIONS

My invention, which I have termed the "oral hydromat" and its modifications which will be set forth in detail, is a device for cleaning teeth and their gingival crevices. Specifically, this invention provides a method and means for preventing, and/or, treating periodontal disease, caries, fractured jaws and malocclusion.

It is essentially a preformed, perforated, liquid semi-inflatable skin-like plastic cuff which covers the teeth and gums, and effectively and simultaneously cleans the teeth and gingival crevices.

The modifications of the "oral hydromat" are:
1. Periodontal splint hydromat.
2. Fracture splint hydromat.
3. Orthodontic hydromat.
4. Pedodontic hydromat.
5. Prosthetic hydromat.

History of hydro-therapy and its benefits

It has long been known that the accumulation of food and debris on, and around teeth, is a primary cause of caries and periodontal disease. Previous inventors have suggested oral hydro-therapy in several forms; however, they have failed to conceive a device capable of effectively cleaning the most important area, i.e., the gingival crevice. My invention is superior to any previous device because:
1. It will clean this critical area effectively, as well as the crowns of the teeth simultaneously, thus eliminating feter oris, caries, periodontal disease, Bruxism.
2. Requires no individual skill, unlike the Water Pik, the tooth brush, tooth pick, dental floss, and thus can be used by paralyzed or debilitated patients.
3. It may be modified and used in periodontics, pedodontics, orthodontics, prosthetics, and during repair of fractured jaws.
4. Can be produced simply, at a very low cost, enabling all people to enjoy its benefits.

The object of my "oral hydromat" is to clean the crowns of teeth and their gingival crevices, thus eliminating caries and periodontal disease. This is accomplished by a forceful pulsating flushing action or a spray, with or without a vibratory movement of the device over the teeth and gums.

OBJECT OF THE MODIFICATIONS

1. Periodontal splint hydromat—to provide a self-cleaning ideal "bandage" for the surgerized gingival and also provide comfort, tooth support, estehtics and tissue protections while healing occurs;
2. Fracture splint hydromat—to provide a cleaning device when jaws are wired together during treatment of fractures of the jaws;
3. Orthodontic hydromat—to provide cleaning device during orthodontics;
4. Pedodontic hydromat—to provide a cleaning device and guide tooth eruption or make minor tooth movement during childhood; and
5. Prosthetic hydromat—to provide cleaning device for partials to:
   a. eliminate food trapping around clasped teeth; and
   b. to provide a floating denture which will improve patient's comfort by evenly distributing denture wearing forces. (See detailed description herein after described.)

A BRIEF SUMMARY OF THE INVENTION

The principle of "hydro-therapy" is not new, but the "hydromat" delivery system of producing an effective pulsating water spray at precisely the right area, is new.

The "oral hydromat" is a semi-inflatable perforated plastic "skin-like" cuff which fits over and around the dental arch, and forcefully sprays a pulsating or non-pulsating cleaning solution over the teeth, and into the gingival crevices simultaneously.

A BRIEF SUMMARY OF THE MODIFICATIONS

1. Periodontal splint hydromat:
   The periodontal splint hydromat is like the "oral hydromat" except that it doesn't cover the crowns and will probably require reinforcing spring wires around the posterior aspects of the splint. Moreover, it is sectioned in the anterior region.
2. Fracture splint hydromat:
   The fracture splint hydromat is essentially a periodontal splint hydromat except its body is wider for added support and has hooks embedded in the body for intermaxillary fixation.
3. Prosthetic hydromat:
   The prosthetic hydromat is simply a name given to any partial denture which has incorporated in it the principle of hydro-therapy. The "oral hydromat" principle is placed into extended arms which fit around the remaining teeth in a mouth and cleans them as well as retains the partial denture in place. Dentures may also be constructed utilizing a sealed fluid center, thus providing an even distribution of chewing forces on the mucosa. This will obviate denture sores which occur when excessive isolated pressures are exerted on selected areas.
4. Orthodontic hydromat:
   The orthodontic hydromat is an "oral hydromat" which has space to accommodate orthodontic appliances.
5. Pedodontic hydromat:
   The pedodontic hydromat is an "oral hydromat" constructed to guide teeth into proper occulsion as well as clean them. For details of specific construction, see detailed description of drawing section.

BRIEF DESCRIPTION OF DRAWINGS

The following drawings illustrate my invention:

FIG. 1 is a perspective view of the "oral hydromat" with a fragment of fluid conduction tubing attached thereto;

FIG. 2 is a translucent top view of an "oral hydromat" as shown in FIG. 1. To demonstrate the relation of the teeth to the "oral hydromat" the teeth are shown through the "oral hydromat";

FIG. 3 is a bottom view of the "oral hydromat" of FIG. 1. The many small perforated spray outlets which surround the teeth are demonstrated;

FIG. 4 is a cross section of an "oral hydromat" through a molar area illustrating one means of drainage;

FIG. 5 is another cross section similar to FIG. 4, illustrating a second method of drainage utilizing a welded perforated plastic suction tube;

FIG. 6 represents the periodontal splint modification of the "oral hydromat". No artificial teeth are present however, these may be added if needed. The cross hatched half, illustrates the inner acrylic layer (see detailed description) with its perforations, while the other half shows a more rigid outer layer, (see detailed description) with its input holes and tie holes;

FIG. 7 is a cross section of the "periodontal splint hydromat" taken on line 7—7 of FIG. 6. It shows how the "oral hydromat" both cleans and splints (supports) the tooth;

FIG. 8 is a suitable "Y" connector for conveying fluid to each side of the "oral hydromat";

FIG. 9 illustrates six erupting upper anterior teeth which are out of alignment;

FIG. 9a shows a pedodontic adaptation of the "oral hydromat" covering the teeth shown in FIG. 9;

FIG. 10 is an end view with parts broken away of FIG. 9 and shows the misplaced teeth;

FIG. 10a is an end view of FIG. 9a with parts broken away and shows how the teeth are corrected or aligned by means of the "oral hydromat";

FIG. 11 illustrates how the modified "oral hydromat" is used to splint fractured jaws and clean teeth simultaneously;

FIG. 12 shows in cross section how the modified splint of FIG. 11, embraces, fixes and stabilizes the fractured bones as well as surround the necks of the teeth to clean the gingival crevices while healing of the fracture occurs;

FIG. 13 illustrates a partial denture on a block, which has been modified by introducing the "oral hydromat" principle into and surrounding areas where the patient's teeth will fit into; and FIG. 14 illustrates the "oral hydromat" principle of a sealed liquid center within a denture. This hydraulic system will evenly distribute the chewing forces. Thus, isolated pressure spots which would result in a "denture sore" are avoided.

DETAILED DESCRIPTION OF DRAWINGS

"Oral hydromat" and its modifications

FIG. 1 shows the body of the "oral hydromat" 20, the impressions which the teeth fit into 21, inner layer 22, the fluid inlet 23, and a connecting tube 24.

A pulsating fluid then enters the body 20, via the inlet 23, from the tube 24, which would be connected to a pulsating fluid source (ordinary water faucet with a "tripping device" like that of a "rainbird lawn sprinkler head" (not shown)); or a mechanical pump with a fluid reservoir; or compressed air with a fluid reservoir.

The arrows (AR) in FIG. 2, shows the path of the fluid being distributed through the body 20. FIG. 3, illustrates the many openings 25 in layer 22, out of which comes the pulsating cleaning fluid.

The construction of the device is best illustrated in cross section FIGS. 4 and 5. The body 20, is composed of two layers 20 and of acrylic 22, with a compressible space 29 between.

The inner layer 22 which contacts the teeth and gums is a soft "skin-like" acrylic (acrylate-skin) which is semi-flexible and inflatable. When pressure is exerted on this layer 22, it is "forced" between and around the teeth and gums. The "skin" can be made from any suitable material for example, Dow-Cornign product of terpolymer, polyethyl methacrylate and formaldehyde, or foam plastic.
plastic.

This skin 22 is individually pre-formed on a model of a patient's teeth and perforated. However, universal type "oral hydromats" could be constructed utilizing the three basic dental arch forms (oval, tapering, square) and made in three sizes such as small, medium and large. This would obviate the need for individual dental impressions and because of layer 22 and its adaptability, the fit of layer 22 against the teeth will still be accurate. Also, only one "oral hydromat" will be necessary because it will be inter-changeable with the upper and lower jaws. Layer 22 is welded to a semi-rigid pre-contoured acrylic layer, layer 20 only at the periphery of layer 22. Thus, a potential space 29 is created which will increase in size when it fills with jets of fluid. This increase in size will force layer 22 in and out alternately against the teeth and gums, spraying its cleaning solution onto these areas and flushing out all debris. Layer 20 like layer 22 is also made on an individual model but later can be manufactured from universal models. Drainage is accomplished when the fluids flow out over the rim (RM) of the "oral hydromat" or is sucked out by a suction outflow system 30. This system consists of a pair of perforated plastic tubes 30—30, the perforations are shown at 31. This is welded to the rim of the "oral hydromat" body 20 and connected to the appropriate drainage tubing leading out of the mouth (not shown).

DETAILS OF DRAWINGS OF THE ORAL HYDROMAT MODIFICATIONS

FIG. 6 is a modification of the "oral hydromat" to be used following periodontal surgery. The right half shows layer 34, whereas the left half (cross hatched) demonstrates layer 33 with its perforations 38, the input holes 36, reinforcement wires 35 and tie holes 37. When the gums are cut and the teeth loose they need both a protective "bandage" support, and a means of cleaning the surgerized sites. This modification of my invention provides all three functions.

FIGS. 6 and 7 illustrates the differences of periodontal splint hydromat from the "oral hydromat," namely that the crowns 27 of the teeth are uncovered, the anterior part of the splint is split in the middle, (SP), tie holes 37, fluid inlet holes into the body 36, and wire reinforcement 35, are present. The tie holes 37 are to tightly secure the periodontal splint hydromat to the dental arches.

The fracture hydromat, FIG. 11, is a periodontal splint hydromat which has greater bulk and width in the body 45 to firmly support fractured bones as shown in simulated fracture at site 43. This device also has hooks 44 incorporated in the body 45 to provide intermaxillary fixation, and reinforcing wires 46. When jaws are fractured the fragments are realigned and this appliance inserted. It will fix the fragments as well as clean the teeth. This will prevent infection as well as shorten the duration of intermaxillary fixation.

The pedodontic hydromat (not shown in detail) is a device for cleaning and guiding the eruption of teeth. Impressions and models are first made of the crooked teeth, FIG. 9. On these models the crooked teeth are rearranged in good alignment and from this "oral hydromat" is constructed. The erupting teeth will now be forced into the new correct alignment, as shown in FIG. 10. Small amounts of plastic can be added from time to time to maintain the desired direction and force on the erupting teeth. FIG. 9 is a diagram of a common situation where erupting teeth are mal-aligned.

FIG. 10 shows a segment of an "oral hydromat" over these teeth, thus correcting the alignment of the teeth and protecting the teeth against caries and periodontal disease.

FIG. 13 illustrates a partial denture 48 on a block (BL). The "oral hydromat" principle has been incorporated in areas marked 47—47. These areas correspond to where teeth are present in the mouth. Since most partial denture failures are caused by food packing around the remaining teeth, the "oral hydromat" principle is applied to these areas. Note: The palate may be cleansed too by and incorporating the "oral hydromat" principle in the palate area.

EXTENDED BREADTH OF DESCRIPTION

My "oral hydromat" can be made more effective by:
1. Introducing ultra-sonic cleaning.
2. Roughening the upper body layer (foam plastic) and imparting a vibratory movement thereto causing pulsations to move the roughened surface over the crowns of the teeth.
3. Utilizing various cleansing solutions (proteletic enzymes, proprietary mouth rinses, or introducing an anti-caries ions like fluoride or phosphate). This solution can be introduced by incorporating a liquid storage container between the pump and the "oral hydromat" or placing the cleaning material (toothpaste) in the "oral hydromat".

While I have shown and described the preferred embodiment of my invention it is to be understood that various changes and modifications may be made therein without departing from the spirit of the invention and I am only limited by the scope of the appended claims.

I claim:

1. A peridontal splint for cleansing teeth, their gingival crevices and embracing the teeth during surgery comprising in combination a separable cuff-like body member having portions adapted for surrounding and embracing the teeth and gums, inner chambers in said body member portions having outlet orifices therein, means for holding said body portions in juxtaposition with respect to each other, means for separating the end of the juxtaposed portions, inlet means connected to said body member portions and communicating with the inner chambers thereof, and means connected to said inlet means for the introduction of fluid under pressure into said chambers whereby the fluid entering said chambers will exit through said outlet orifices and contact the teeth and the gingival crevices.

2. A peridontal splint as set forth in claim 1, characterized in this, that the cuff-like body member is simi-resilent, arcuate in configuration and is provided with an inner and outer chamber, and that the outlet orifices extend inwardly from the periphery of said body members.

3. A peridontal splint as set forth in claim 1, characterized in this, that the cuff-like body members embraces only the sides of the teeth and gums and do not extend over the crown of the teeth.